United States Patent [19]

Gerlacher et al.

[11] Patent Number: 5,002,390

[45] Date of Patent: Mar. 26, 1991

[54] ATOMIC EMISSION SPECTROMETER FOR SIMULTANEOUS MULTI-ELEMENT MEASUREMENT OF ELEMENTS IN A SAMPLE

[76] Inventors: Edgar Gerlacher, Buhlenweg 36, 7750 Konstanz; Carl G. Dencks, Prielstr. 3, 7776 Owingen; Uwe Gunther, Bernhard-Endres-Weg 16, 7776 Owingen; Gunther Rodel, Hinter den Garten, 7776 Owingen, all of Fed. Rep. of Germany

[21] Appl. No.: 335,077

[22] Filed: Apr. 7, 1989

[30] Foreign Application Priority Data

Apr. 9, 1988 [DE] Fed. Rep. of Germany ....... 3811922

[51] Int. Cl.5 ............................. G01J 3/36; G01J 3/443
[52] U.S. Cl. ..................................... 356/307; 356/328
[58] Field of Search ................ 356/307, 308, 310, 305, 356/328

[56] References Cited

U.S. PATENT DOCUMENTS 4,158,505 6/1979 Mathisen et al. .................... 356/308
4,820,048 4/1989 Barnard ............................... 356/328

OTHER PUBLICATIONS

Weekley et al., "A Versatile Electronic Computer for Photoelectric Spectrochemical Analysis", Applied Spectroscopy, vol. 18, #1, 1964, p. 21.

Primary Examiner—Vincent P. McGraw
Attorney, Agent, or Firm—Thomas P. Murphy; Edwin T. Grimes

[57] ABSTRACT

An atomic emission spectrometer for multi-element measurement of elements in a sample comprises an apparatus to atomize the sample and to excite the atoms for emitting characteristic spectral lines, a dispersion device which generates a spectrum of the light emitted by the atoms in a focal plane, and a plurality of semiconductor photodetectors, each of which is exposed to one of said characteristic spectral lines. A plurality of semiconductor photodetectors which are exposed to different spectral lines of different intensities of the line spectrum emitted by the atoms of the respective element are utilized so as to achieve a sufficiently large dynamic range for each element to be measured. For measuring each element, an evaluating circuit is arranged to select one semiconductor photodetector for which the intensity of the associated spectral line lies within a part of the measuring range of the semiconductor photodetector which is as favorable as possible.

9 Claims, 2 Drawing Sheets

ATOMIC EMISSION SPECTROMETER FOR SIMULTANEOUS MULTI-ELEMENT MEASUREMENT OF ELEMENTS IN A SAMPLE

BACKGROUND AND SUMMARY OF THE INVENTION

This invention relates to atomic emission spectroscopy and more particularly to an atomic emission spectrometer and technique for multi-element measurement of elements in a sample.

Atomic absorption spectroscopy (hereinafter "AAS") is a known procedure for measuring the concentration of a certain element in a sample. AAS utilizes the fact that atoms absorb light at certain wavelengths characteristic of the particular element. Atoms emit light in the form of a line spectrum when excited and the line spectrum is characteristic of the respective element. Correspondingly, the atoms absorb light only at the wavelengths of this line spectrum.

In AAS, an atomizing device such as a flame burner or a graphite furnace for electrothermal atomization is utilized to generate an atomic vapor of the sample in which the atoms of the sample are present in their atomic state. A measuring light beam is normally generated by a hollow cathode lamp and consists of light with the line spectrum of the looked-for element. This measuring light beam is passed through the atomic vapor and is subjected to absorption according to the amount of the looked-for element in the sample. The other components of the sample, at least theoretically, do not influence the measuring light beam because their absorption lines do not coincide with the line spectrum of the measuring light beam. The measuring light beam impinges on a photoelectric detector and the concentration of the looked-for element is determined from the detector signal after suitable processing and calibration. Conventionally, a photomultiplier is used as the detector in atomic absorption spectrometers.

A certain element concentration range is required for the absorption measurement. A concentration of the looked-for element which is too high causes virtually complete absorption of the measuring light beam such that measurement is no longer possible. In AAS, an optimal concentration range can be achieved by dilution if necessary because only one element at a time is being determined.

A disadvantage of AAS is that it is not suited for a multi-element measurement of a large number of elements. In AAS, the elements can only be determined one by one, i.e., one after the other. Therefore, another known analytical procedure is to measure the emission of a sample rather than its absorption, i.e., atomic emission spectroscopy, which facilitates multi-element measurement.

In atomic emission spectroscopy, plasma burners are often used as the atomization and excitation device in atomic emission spectroscopy. In plasma burners, an emerging inert gas is inductively transformed to a plasma of high temperature and the sample is led into this plasma. In another prior art atomization and excitation device, a sample is electrothermally dried and ashed in a graphite furnace similar to the graphite tubes used in AAS. The graphite furnace is then evacuated and an inert gas is introduced. Subsequently, an electrothermal atomization of the sample is effected. A gas discharge is caused in the mixture of inert gas and sample vapor by an anode such that the graphite tube operates as a hollow cathode lamp. The graphite tube serves as a hollow cathode.

A spectrum of the emitted light is generated by means of a polychromator. It is known to scan such a spectrum by means of a series detector or "detector array" consisting of a plurality of photodetectors. The entire spectrum is detected which results in a large amount of data and the signal processing is correspondingly complex.

A polychromator is known in which a dispersion is effected in high order in a first direction by an echelle grating. The different orders overlap and a dispersion is effected in a second direction perpendicular to the first direction by a dispersion prism whereby the different orders are separated. This results in a two-dimensional spectrum with very high resolution in a focal plane.

In the prior art polychromator, a mask with apertures at the location of the spectral lines of the spectrum which are characteristic of a certain element is arranged in the focal plane. These apertures are arranged to accommodate light pipes, each of which is guided to an associated photomultiplier. The number of available photomultipliers and thus the number of elements which can be analyzed simultaneously is therefore necessarily limited due to cost considerations.

In atomic emission spectroscopy for multi-element measurement, i.e., simultaneous measurement of several elements, the problem arises that the different spectral lines observed can have largely varying intensities. This may be due to the fact that the different elements which are associated with the individual spectral lines are contained in the sample in quite different concentrations. It may also be due to the fact that the different spectral lines can have quite different intensities. This problem is a quite different situation than that noted previously with respect to AAS where only one single spectral line of one single element is used at a time for measuring the concentration of this element. In the AAS situation with substantially constant intensity of the measuring light beam, it is possible to place the absorption of the atomic vapor into an optimum measuring range by well-defined dilution of the sample. In atomic emission spectroscopy, however, a dilution of the sample to place the spectral line of a first element into a favorable intensity range could push even the strong spectral lines of a second element below the detection limit.

Photomultipliers have the advantage of permitting a change of sensitivity by changing the applied voltage. Therefore, a large dynamic range as required for a multi-element measurement can be attained but preliminary adjustment is required. In an unknown sample, the concentrations of the different elements to be measured are not initially known and therefore, the intensities of the various observed lines are also not known. Consequently, checks are required before the actual measurement to permit adjustment of the voltages of the multipliers in accordance with such checks.

The dynamic ranges of photodiodes or similar semiconductor photodetectors are too small to permit adaptation to the different intensities of the spectral lines which occur in the multi-element measurement of atomic emission spectroscopy.

Accordingly, it is an object of the present invention to provide an atomic emission spectrometer and technique which overcomes many of these disadvantages and deficiencies.

Another object of the invention is to provide an atomic emission spectrometer for multi-element analysis which affords simultaneous measurement of a relatively large number of elements and wide dynamic range detection without pre-measurement adjustment.

Another object of the invention is to provide such an atomic emission spectrometer which is economical to construct.

A further object of the invention is to provide an atomic emission spectroscopy detection technique for multi-element measurements which accomplishes wide dynamic range line detection while facilitating the use of low cost detector elements.

Other objects will be in part obvious and in part pointed out more in detail hereinafter.

Accordingly it has been that the foregoing and related advantages are attained in an atomic emission spectrometer for multi-element measurement which includes an apparatus to atomize a sample and excite the atoms to emit characteristic spectral lines, a dispersion assembly to generate a spectrum of characteristic spectral lines, a photodetector assembly for simultaneously sensing the intensity of spectral lines of a plurality of elements and processing circuit means for determining the concentrations of the plurality of elements. The photodetector assembly has a plurality of semiconductor photodetectors positioned for simultaneously sensing a plurality of spectral lines for each element of the sample to be tested. An evaluation circuit selects the semiconductor photodetectors sensing the spectral line for each element which has an intensity optimally within the sensing range of the respective semiconductor photodetector.

DESCRIPTION OF THE PREFERRED EMBODIMENT

Figure 1:
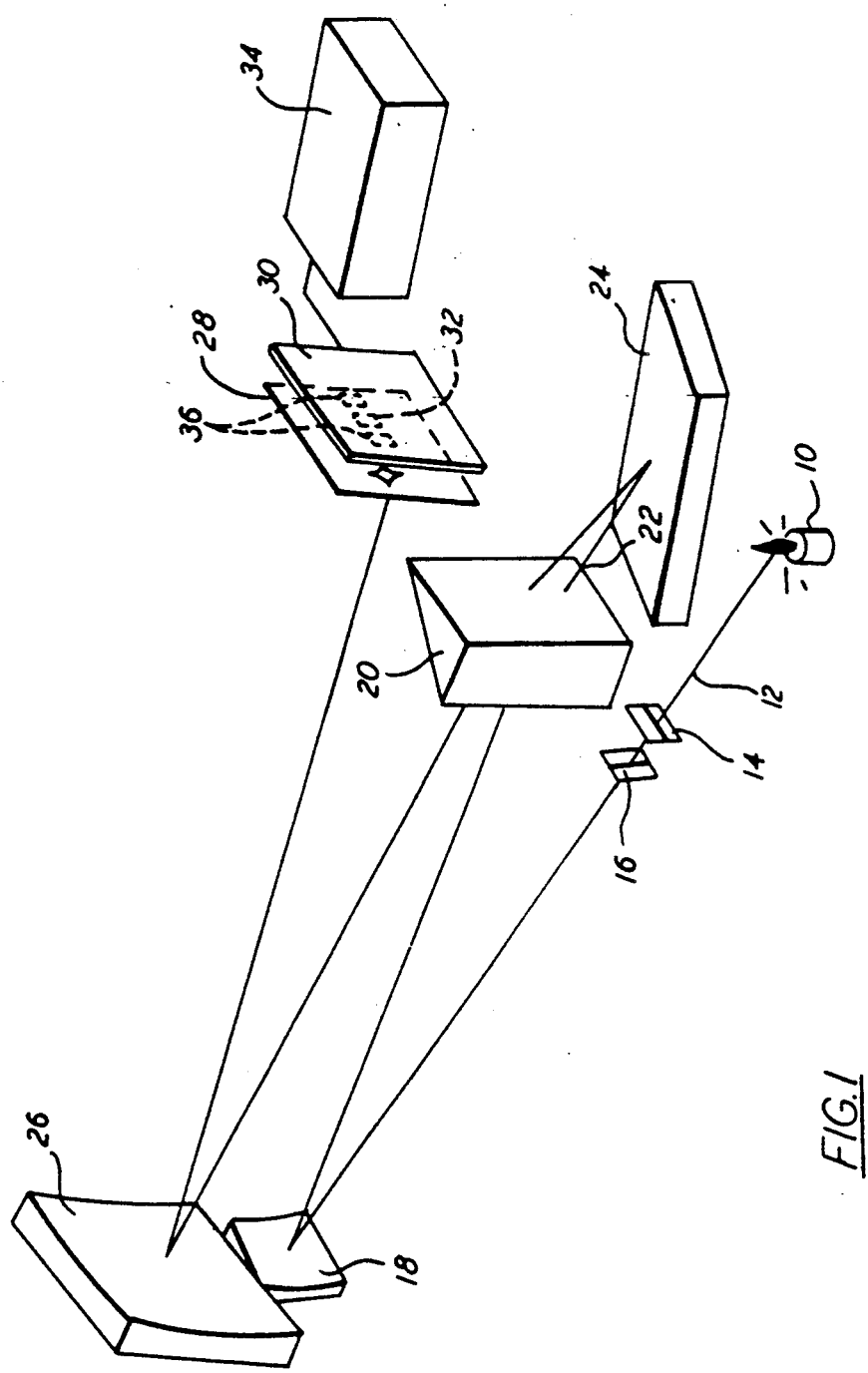
FIG. 1 is a schematic perspective view of an atomic emission spectrometer for multi-element measurement with semiconductor photodetectors.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, the numeral 10 designates an atomization and excitation device which is illustrated here as a plasma burner. Alternately, a hollow cathode lamp such as disclosed in German patent C2-30,13,354 may be used which comprises a graphite tube for electrothermal drying, ashing and atomization of the sample and an anode. Such a hollow cathode lamp is evacuated after ashing and is filled with inert gas. After atomization, a gas discharge is generated during which the graphite tube assumes the function of a hollow cathode.

A light beam 12 originates from the atomization and excitation device 10 and is formed by light with line spectra of the different elements contained in the sample. These line spectra are emitted due to the excitation of the atoms of the elements contained in the sample.

The line spectra are characteristic of the respective element and each comprises several spectral lines. The intensities of the spectral lines are proportional to the amount or the concentration of the element in the sample. The spectral lines of a line spectrum characteristic of a certain element have different intensities. Each line spectrum has spectral lines with a relatively high intensity and other weaker spectral lines with a relatively low intensity.

The light beam 12 is limited by a main slit 14 extending horizontally in FIG. 1 and a transverse slit 16 extending perpendicular thereto. The light beam 12 is collimated by a collimator mirror 18 and is passed through a dispersion prism 20. The light beam 22, once spectrally dispersed by the dispersion prism 20, is incident at a large angle of incidence on the echelle grating 24, i.e., with a small angle between the beam and the grating. The echelle grating accomplishes a spectral dispersion of the light beam 22 by diffraction in a direction perpendicular to that in which the dispersion was accomplished by the dispersion prism 20, i.e., in a substantially vertical plane in FIG. 1. This diffraction is observed in high order. A very large spectral dispersion is effected but with a large overlap of the different orders. The diffracted light passes through the dispersion prism 20 again and is collected by a camera mirror 26 in a focal plane 28.

A highly resolved spectrum with the lines of the single elements is generated in the focal plane 28. The different orders of the echelle grating 24 are separated by the dispersion prism 20 and are located in the spectrum side by side. The individual lines appear as light points.

Figure 2:
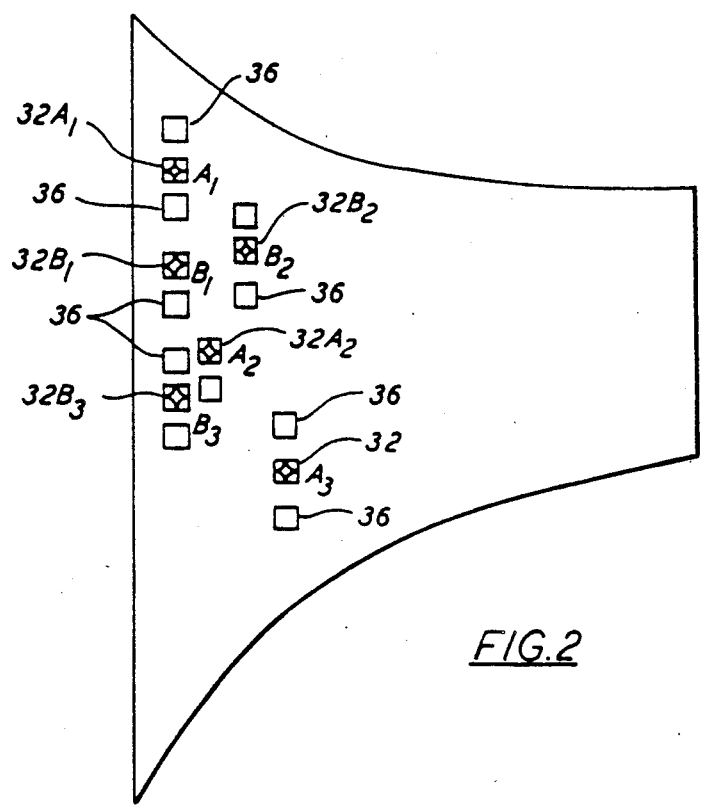
FIG. 2 is a diagrammatic view of a spectrum as obtained in the focal plane of the atomic emission spectrometer of FIG. 1.

FIG. 2 is a schematical illustration of the arrangement of the spectral lines in the spectrum. For clarity, only spectral lines for two elements are indicated, which are designated by "A" and "B".

Figure 3:
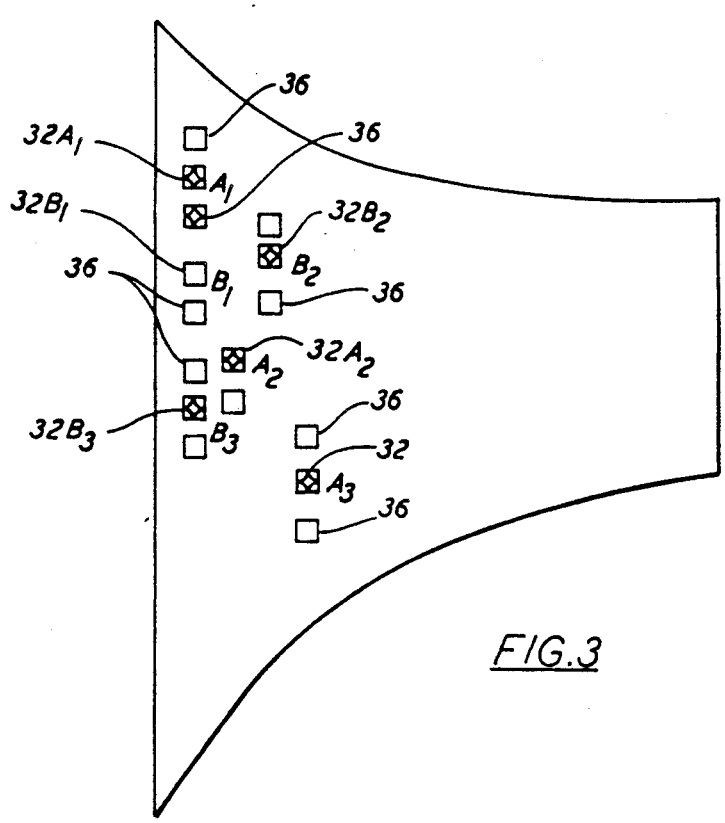
FIG. 3 is a diagrammatic view of the position of semiconductor photodetectors relative to the spectral lines.

A detector carrier 30 is arranged in the focal plane. Semiconductor photodetectors 32 are arranged on this detector carrier, each at the location of an associated spectral line. As can be seen in FIG. 3, one semiconductor photodetector 32 each are arranged at the location of several spectral lines of each element. In FIG. 3, semiconductor photodetectors 32A1, 32A2, and 32A3 are arranged at the locations of the spectral lines A1, A2 and A3, respectively, of the element A. Correspondingly, semiconductor photodetectors 32B1, 32B2, and 32B3 are arranged at the locations of the spectral lines B1, B2 and B3. The spectral line A1 is the main line of the element A and has the highest intensity compared to the intensities of the other spectral lines of the element A. The second spectral line A2 has an intensity which is lower by some orders of magnitude than the intensity of the main line A1. The third spectral line A3 is even substantially weaker than the second spectral line A2. The relations of the spectral lines of element B are similar.

The semiconductor photodetectors 32 are connected to an evaluating circuit 34 which is indicated by a block in FIG. 1. The evaluating circuit 34 checks each semiconductor photodetector 32 for whether its signal lies within the measuring range of the semiconductor photodetector or whether the semiconductor photodetector is saturated by the intensity of the associated spectral line, A1, for example. The signal of such a saturated semiconductor photodetector (32A1) is not processed further. Then the same check of the semiconductor photodetector 32A2 and, if required, also of the semiconductor photodetector 32A3 is carried out. If the signal of a semiconductor photodetector lies in its measuring range, the signal is processed further with a factor which corresponds to the ratio of the intensities of the respective spectral line and the reference line, spectral line A1, for example.

Thereby, the ratios of the intensities of different spectral lines used are superposed to the dynamic range of the semiconductor photodetector such that a sufficiently large dynamic range is obtained. The selection of the signal to be processed can be made automatically by the evaluating circuit 34. It is not necessary to adjust the different photodetectors prior to the actual measurement as with the prior art photomultipliers.

Thus, the detector assembly comprises a plurality of semiconductor photodetectors, each of which is exposed to one of the characteristic lines. A plurality of semiconductors is provided for each element to be measured with the semiconductor photodetectors being exposed to different spectral lines of different intensities of the light spectrum emitted by the atoms of the element. The evaluating circuit is adapted to select, for measuring each element, one semiconductor photodetector for which the intensity of the associated spectral line lies in a part of the measuring range of the semiconductor photodetector which is as favorable as possible.

Additional semiconductor photodetectors 36 are provided to correct for background, i.e., background emission. The semiconductor photodetectors 36 are arranged outside the spectral lines, preferably close thereto, and provide the course of the background emission. A value of the background emission at the location of the spectral lines can be obtained from the signals of the semiconductor photodetectors 36. The measured intensity of the spectral lines can be corrected based upon this background value in order to obtain an exact measuring value of the concentration of the respective element in the sample.

The semiconductor photodetectors can be mounted on a carrier one by one in a two-dimensional arrangement. The semiconductor photodetectors can also be arranged in an integral unit. The semiconductor photodetectors are of such small dimensions and are relatively inexpensive such that a great number of sample elements and the background emission value can be simultaneously measured in the way described with a plurality of such semiconductor photodetectors being provided for each element. However, it is not necessary to detect each wavelength virtually continuously. Thereby, the expenditure for the signal processing is kept within acceptable limits. It is also possible to scan and process the signals of all semiconductor photodetectors virtually simultaneously with reasonable expenditure such that the concentrations of the different elements are associated with the same point in time.

As can be seen, the present invention uses semiconductor photodetectors which are substantially cheaper than photomultipliers. Semiconductor photodetectors have small dimensions and can be arranged directly in the focal plane or behind a mask provided there. Individually, the semiconductor photodetectors are not able to cover the dynamic range ocurring with multi-element measurement in atomic emission spectroscopy. The invention however takes advantage of the fact that each element emits a plurality of spectral lines which have different intensities. Therefore it is possible to detect several spectral lines of each element by one semiconductor photodetector each. This is easily accomplished because each of these semiconductor photodetectors has small dimensions and is relatively inexpensive. These spectral lines have different intensities which can differ by orders of magnitude. If the sample contains a high concentration of one element, a spectral line of high intensity can be too bright (relative to the other spectral lines of this element) such that it exceeds the dynamic range of the semiconductor photodetector and saturates the semiconductor photodetector. This is detected by the evaluating circuit and, accordingly, the signal of a semiconductor photodetector which is exposed to a spectral line of the same element but of relatively low intensity is utilized for evaluation. If, however, an element is present in a low concentration, the signal evaluating circuit will use the signal of that semiconductor photodetector which is exposed to the spectral line of maximum intensity of the respective element. The required dynamic range of the entire arrangement can be achieved by taking into account the dynamic range of present semiconductor photodetectors and the intensity differences of different spectral lines of each element.

Accordingly, small and relatively inexpensive photodetectors can be used and the technical expenditure thereby becomes smaller. Using several of such semiconductor photodetectors for each individual element permits, on one hand, the required dynamic range to be achieved by such semiconductor photodetectors. On the other hand, the use of a plurality of photodetectors for each element becomes economically possible because of the use of the (inexpensive) semiconductor photodetectors.

Furthermore, the use of semiconductor photodetectors offers the possibility to generate a background signal in the focal plane by additional semiconductor photodetectors at other suitable locations of the generated spectrum to compensate the measuring signal with respect to background.

As will be apparent to persons skilled in the art, various modifications and adaptations of the structure above described will become readily apparent without departure from the spirit and scope of the invention, the scope of which is defined in the appended claims.

What is claimed is:

1. An atomic emission spectrometer for multi-element measurement of elements in a sample comprising
   means for atomizing a sample and for exciting atoms to emit light with characteristic spectral lines of elements contained in the sample,
   dispersing means for generating a spectrum of characteristic spectral lines of the emitted light in a focal plane,
   photodetector means for simultaneously sensing the intensity of spectral lines of a plurality of elements,
   said photodetector means comprising a plurality of semiconductor photodetectors being disposed for simultaneously sensing a plurality of spectral lines for each element of the sample to be measured and so that spectral lines of each element to be tested are each sensed by a semiconductor photodetector,
   evaluation circuit means interconnected to said semiconductor photodetectors for automatically selecting each of the semiconductor photodetectors generating signals responsive to respective line intensity within the optimal sensing ranges of said semiconductor photodetectors, and
   processing circuit means for determining the concentrations of the plurality of elements.

2. The device of claim 1 wherein said plurality of semiconductor photodetectors are mounted to a support member substantially within said focal plane.

3. The device of claim 2 wherein said evaluation circuit means comprises means for determining whether each semiconductor photodetector is saturated.

4. An atomic emission spectroscopic method of multi-element measurement of elements in a sample comprising
 atomizing a sample so that the elements of the sample are transformed into an atomic state,
 exciting the transformed atoms to emit light containing characteristic spectral lines for each element,
 generating a spectrum of said emitted light to provide a plurality of spectral lines of varied intensity for each element,
 selecting an optimum spectral line for each element such that the intensity of each selected spectral line is within a predetermined range,
 measuring the intensity of each selected spectral line, and
 determining the concentration of each element from the measured intensity of the corresponding selected spectral line.

5. The method of claim 4 wherein the step of selecting an optimum spectral line for each element comprises
 sensing a predetermined number of said spectral lines for each element with a plurality of semiconductor photodetectors having an operating range including said predetermined range, and
 evaluating said photodetectors to determine for each element the particular photodetector sensing the corresponding spectral line with an intensity within said predetermined range.

6. An atomic emission spectrometer for multi-element measurement of elements in a sample comprising
 means for atomizing a sample and for exciting atoms to emit light comprising characteristic spectral lines of elements in the sample,
 dispersing means for generating line spectra of the different elements contained in the sample from the emitted light, each line spectra being comprised of several spectral lines of different intensities and being characteristic of the associated element,
 photodetector means for simultaneously individually sensing the spectral lines of each element of the multiple element to be tested,
 means for automatically selecting said photodetector means for which the intensity of the associated spectral line lies within the optimal measuring range of its associated photodetect means, and
 processing circuit means for determining the concentration of each element based upon the corresponding selected spectral line signal of said element.

7. The device of claim 6 wherein
 said dispersing means comprises means for resolving said spectral lines as predisposed light points and
 said photodetector detector means comprises a plurality of semiconductor photodetectors disposed so that each semiconductor photodetector is positioned to sense an associated light point.

8. The device of claim 6 wherein
 said dispersing means comprises a first dispersion means for spectrally dispersing the emitted light in a first direction, second dispersing means for subsequently spectrally dispersing said light in a second direction perpendicular to said first direction, and means for collecting the dispersed light as characteristic spectral lines in predetermined positions in a focal plane, and
 said photodetector means comprises a carrier mounting a plurality of semiconductor photodetectors, said semiconductor photodetectors being mounted in said focal plane and disposed so that a spectral line is sensed by an associated semiconductor photodetector.

9. The device of claim 8 wherein said first dispersion means comprises a prism and said second dispersion means comprises an echelle grating.

* * * * *